US012748235B2

(12) United States Patent
Makino

(10) Patent No.: US 12,748,235 B2
(45) Date of Patent: Sep. 29, 2026

(54) MANAGEMENT SYSTEM AND MANAGEMENT METHOD

(71) Applicant: SINTOKOGIO, LTD., Nagoya (JP)

(72) Inventor: Yoshiyasu Makino, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 128 days.

(21) Appl. No.: 18/754,259

(22) Filed: Jun. 26, 2024

(65) Prior Publication Data

US 2025/0020825 A1 Jan. 16, 2025

(30) Foreign Application Priority Data

Jul. 13, 2023 (JP) ................................ 2023-115404

(51) Int. Cl.

| | |
|---|---|
| ***G01V 3/38*** | (2006.01) |
| ***G01N 23/10*** | (2018.01) |
| ***G01N 27/82*** | (2006.01) |
| ***G01V 3/08*** | (2006.01) |
| ***G01V 11/00*** | (2006.01) |
| *G01V 15/00* | (2006.01) |

(52) U.S. Cl.

CPC ............... *G01V 3/38* (2013.01); *G01N 23/10* (2013.01); *G01N 27/82* (2013.01); *G01V 3/08* (2013.01); *G01V 11/002* (2013.01); *G01V 15/00* (2013.01)

(58) Field of Classification Search

CPC .......... G01V 3/38; G01V 3/08; G01V 11/002; G01V 15/00; G01V 11/00; G01N 23/10; G01N 27/82; G01N 27/72; G01N 23/18; G01N 2223/1016; G01N 2223/645; G01N 2223/652; G06Q 50/04; G06Q 50/10

See application file for complete search history.

(56) References Cited

U.S. PATENT DOCUMENTS

2007/0058777 A1* 3/2007 Kondo .................. G01N 23/04 378/57

FOREIGN PATENT DOCUMENTS

| | | | |
|---|---|---|---|
| JP | 2015-111075 | A | 6/2015 |
| JP | 5779273 | B1 | 9/2015 |
| JP | 6006901 | B1 | 10/2016 |
| JP | 6957076 | B1 | 11/2021 |
| JP | 2023-003417 | A | 1/2023 |

* cited by examiner

*Primary Examiner* — Courtney D Thomas

(74) *Attorney, Agent, or Firm* — Harness, Dickey & Pierce, P.L.C.

(57) ABSTRACT

A management system is a system for managing a processing facility, and includes a foreign substance detector for detecting whether a foreign substance is mixed in a product, and a management device capable of processing information on the foreign substance. The management device acquires the information on the foreign substance from the foreign substance detector, and acquires, based on the information on the foreign substance, information on the state of a processing machine.

10 Claims, 8 Drawing Sheets

FIG. 3

| NAME OF PART | SHAPE OF PART | TARGET PROCESSING MACHINE |
|---|---|---|
| BOLT B1 | Φ ○ mm<br>LENGTH ○ mm | STIRRING MACHINE |
| NUT N1 | WIDTH ACROSS FLATS ○○ mm<br>HEIGHT ○○ mm | |
| SCREW S1 | PITCH ○○○ mm<br>LENGTH ○○○ mm | |
| BOLT B2 | Φ △ mm<br>LENGTH △ mm | FILLING MACHINE |
| NUT N2 | WIDTH ACROSS FLATS △△ mm<br>HEIGHT △△ mm | |
| SCREW S2 | PITCH △△△ mm<br>LENGTH △△△ mm | |
| BOLT B3 | Φ □ mm<br>LENGTH □ mm | PACKAGING MACHINE |
| NUT N3 | WIDTH ACROSS FLATS □□ mm<br>HEIGHT □□ mm | |
| SCREW S3 | PITCH □□□ mm<br>LENGTH □□□ mm | |

MANAGEMENT SYSTEM AND MANAGEMENT METHOD

This Nonprovisional application claims priority under 35 U.S.C. § 119 on Patent Application No. 2023-115404 filed in Japan on Jul. 13, 2023, the entire contents of which are hereby incorporated by reference.

TECHNICAL FIELD

The present disclosure relates to a management system and a management method.

BACKGROUND ART

As the technique (foreign substance detector) for detecting, in a processing facility for processing or producing food, medicines, etc., whether a foreign substance is mixed in a manufactured product, a metal detector and an X-ray foreign substance detector are known. For example, Patent Literature 1 discloses a metal detector for detecting a ferromagnetic foreign substance mixed in a product.

CITATION LIST

Patent Literature

[Patent Literature 1]
Japanese Patent No. 5779273

SUMMARY OF INVENTION

Technical Problem

When these foreign substance detectors detect a foreign substance, a product mixed with the foreign substance is removed from a production line. Further, depending on the frequency of mixing of the foreign substance or the type of foreign substance, it is necessary to stop the production line to inspect the production line. In this respect, in order to acquire information on the state of a processing machine including: the operational status of a processing facility; an anomaly of a processing facility; and identification of an anomalous portion in a processing facility or in a case of a processing facility includes a plurality of processing machines, identification of a processing machine in which an anomaly has occurred, it is necessary to provide a plurality of detecting means such as a sensor and an image capturing device.

However, providing a plurality of detecting means in a processing facility is a factor in increasing in cost and further makes the management cumbersome, and a burden on the workers in the processing facility increases accordingly. To address these problems, the inventors focused on the following point: making it possible to acquire information on the state of a processing machine with use of a foreign substance detector already installed in the processing facility eliminates the need for providing a plurality of detecting means, and therefore makes it possible to solve the problems. Patent Literature 1 does not disclose this point at all.

An object of an aspect of the present disclosure is to acquire information on the state of a processing machine.

Solution to Problem

In order for the above-described problems to be solved, a management system in accordance with an aspect of the present disclosure is a management system for managing a processing facility. The management system includes a foreign substance detector and a processor. The foreign substance detector detects whether a foreign substance is mixed in a product manufactured by a processing machine in the processing facility. The processor processes information on the foreign substance detected by the foreign substance detector. The processor acquires the information on the foreign substance from the foreign substance detector, and acquires, based on the information on the foreign substance, information on a state of the processing machine.

In order for the above-described problems to be solved, a management method in accordance with as aspect of the present disclosure is a method for managing a processing facility. The management method includes the following two steps.

(1) A step of acquiring information on the foreign substance. In this step, the information on the foreign substance is acquired from a foreign substance detector for detecting whether a foreign substance is mixed in a product manufactured by a processing machine in the processing facility.

(2) A step of acquiring information on a state of the processing machine. In this step, the information on the state of the processing machine is acquired based on the information on the foreign substance.

Advantageous Effects of Invention

With an aspect of the present disclosure, it is possible to acquire information on the state of a processing machine.

BRIEF DESCRIPTION OF DRAWINGS

FIG. 3 is a diagram for explaining an example of a parts database.

DESCRIPTION OF EMBODIMENTS

Embodiment 1

Figure 1:
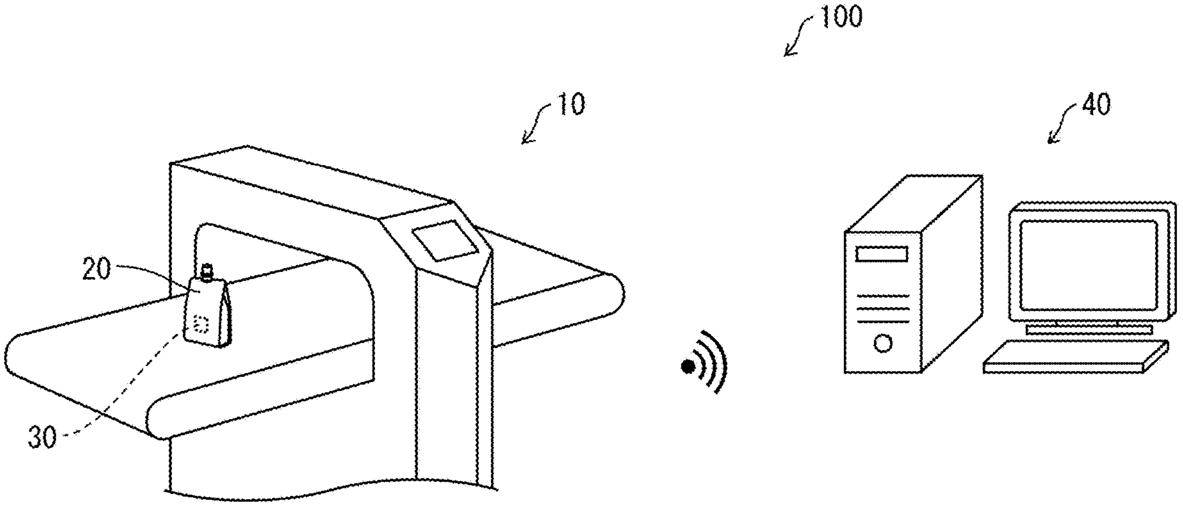
FIG. 1 is a schematic view of a configuration of a management system in accordance with Embodiment 1 of the present disclosure.

The following description will discuss a management system 100 in accordance with Embodiment 1 of the present disclosure in detail with reference to the drawings. Components identical to each other are assigned the same reference sign in descriptions in the drawings, and the description thereof is not repeated.

(Example Configuration of Management System 100)

FIG. 1 is a schematic view illustrating an example of the management system 100. The management system 100 includes a metal detector 10 and a management device 40, as illustrated in FIG. 1.

The place in which the metal detector 10 and the management device 40 are installed is not particularly limited, but the metal detector 10 and the management device 40 are installed in, for example, a food-processing facility. Although a case where the metal detector 10 and the management device 40 are installed in a food-processing facility is taken as an example and described in the following, the metal detector 10 and the management device 40 may be installed in a facility for processing or producing drinks, medicines, cosmetics, everyday items or clothing.

The metal detector 10 is a device for inspecting a product 20 manufactured in a food-processing facility for mixing of a metal foreign substance 30. The metal detector 10 detects the metal foreign substance 30 which is mixed in the inside of the product 20 and is thus difficult to visibly identify from outside. In the present embodiment, the so-called magnetic bias type magnetic field line method is adopted as an example of the detection method carried out by the metal foreign substance 30. The "magnetic bias type magnetic field line method" is described as follows. In the metal detector 10, magnets (not illustrated) are provided such that a production line is sandwiched between the magnets in the vertical direction. When the metal foreign substance 30 passes between the magnets, variation occurs in the magnetic field lines emitted by the magnets. With the magnetic bias type magnetic field line method, the metal foreign substance 30 is detected based on this variation in the magnetic field lines. Note that the metal foreign substance 30 may be a foreign substance made up only of a metal element, or may be a foreign substance made up of a metal element and a non-metal element. Further, the metal element may be a single element, or may be constituted by a plurality of elements (a so-called alloy).

In comparison with the so-called search-coil method, which is a conventional method, the magnetic bias type magnetic field line method enables high-accuracy detection of metal foreign substances not only in packages of paper, vinyl, and plastic but also in a product with an aluminum vapor-deposited package, such as retort pouch food, and liquid food which has a high salt concentration, such as a curry roux or soy sauce.

Examples of the metal foreign substance 30 which can be mixed in the product 20 include parts of the processing machine. Examples of the parts of the processing machine include a bolt, a nut, and a screw which are made of metal, and a cable tie made of a resin in which a magnetic powder is mixed. Typically, food processing consists of a large number of steps, and for each of the steps, a dedicated processing machine is used.

Examples of the type of processing machine include a cutting machine for slicing and cutting a material, a stirring machine for stirring a material, a filling machine for filling a retort pouch or the like with a drink, and a packaging machine for packaging a processed product.

Examples of the product 20 which is the subject of inspection include food and a drink with which a package, a container, or the like is filled.

While a food-processing facility is in operation, a bolt, a nut, a screw, and the like can fall off a processing machine due to rust formation, looseness of the assembly, metal fatigue, etc. In a case where the metal having thus fallen off is mixed in the product 20, the metal is detected by the metal detector 10 as the metal foreign substance 30.

When the metal foreign substance 30 is detected by the metal detector 10, a typical process carried out thereafter is considered to be, for example, the following process.

First, a worker working in the food-processing facility is notified of the detection of the metal foreign substance 30. For example, the worker notified removes the product 20 mixed with the metal foreign substance 30 from the production line, and also stops all the processing machines. The worker then starts inspecting all the processing machines.

In this situation, if it is possible to know, before the start of the inspection of the processing machines, a processing machine which the metal foreign substance 30 mixed in the product 20 has fallen off, it is possible to significantly reduce the time and cost for inspecting the processing machines, and a burden on the worker is lightened. This enables the worker to bring the processing machines into operation again after inspecting and repairing a target processing machine alone, and safely restart the production activity.

In the light of this, the present embodiment has a configuration in which the processing machine which the metal foreign substance 30 mixed in the product 20 has fallen off is inferred and identified, and a worker is notified of the result of the identification. This makes it possible to significantly reduce the time and cost required for the inspection of processing machines as described above, and a burden on the worker is lightened accordingly. In the following description, examples of the identification method and the notification method will be described sequentially. Hereinafter, "inferring and identifying" can be simply referred to as "identifying".

Upon inspection of the product 20 delivered by being conveyed on the production line, the metal detector 10 converts data on the inspection into an electric signal regardless of the presence or absence of the detection of the metal foreign substance 30, and transmits the electric signal to the management device 40 via a predetermined communications scheme. In a case where the metal foreign substance 30 is detected, the metal detector 10 converts data on foreign substance detection such as variation in magnetic field lines, into an electric signal, and transmits the electric signal to the management device 40. An example of the "data on foreign substance detection such as variation in magnetic field lines" is a voltage waveform as a function of the breadth of voltage and the breadth of time that are based on the electric signal which varies in relation to the magnetic field which varies due to the metal foreign substance 30. The communications may be conducted either wirelessly or via wired connections, and any communications scheme can be used provided that the communications scheme makes it possible to conduct intercommunications. Assuming that communications between the metal detector 10 and the management device 40 are conducted via Wi-Fi (registered trademark) in the present embodiment, descriptions are provided.

(Hardware Configuration of Management Device 40)

Figure 2:
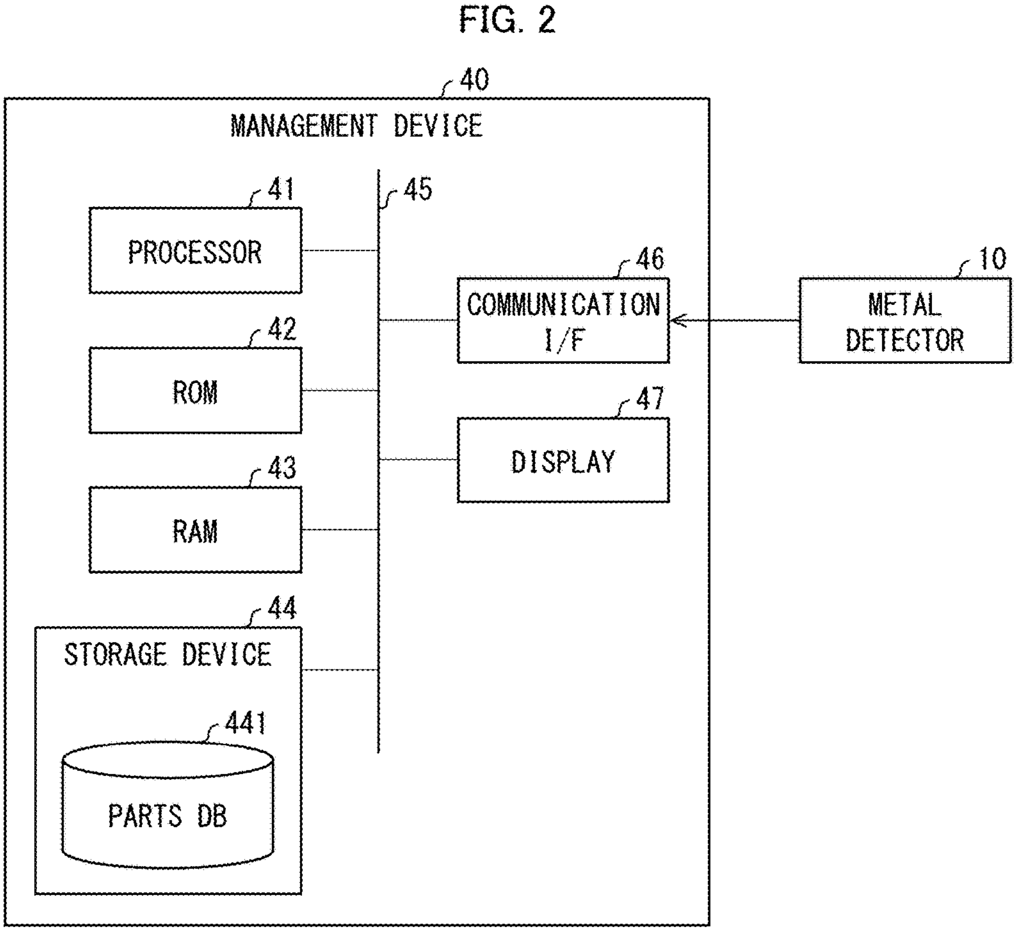
FIG. 2 is a block diagram illustrating a hardware configuration of a management device in accordance with Embodiment 1 of the present disclosure.

A hardware configuration of the management device 40 will be described next with reference to FIG. 2. FIG. 2 is a block diagram illustrating a hardware configuration of the management device 40. The management device 40 is, for example, a general-purpose computer.

The management device 40 includes a processor 41, a read only memory (ROM) 42, a random access memory (RAM) 43, a storage device 44, a communication interface (I/F) 46, and a display 47, as illustrated in FIG. 2. These components are communicably connected to each other via a bus 45.

The processor 41 is an arithmetic unit which executes various programs, and is, for example, a central processing unit (CPU). The processor 41 retrieves programs from the ROM 42 or the storage device 44, to execute various programs on the RAM 43 which is a workspace.

The ROM 42 stores various programs and various kinds of data. The RAM 43 temporarily stores a program or data as a workspace. Note that a computer-readable recording medium is not limited to the ROM 42 and the RAM 43, but may include an erasable programmable ROM (EPROM), an electrically erasable programmable ROM (EEPROM) (registered trademark), or the like.

The storage device 44 is composed of a hard disk drive (HDD), a solid state drive (SSD), a flash memory, or the like, and stores various programs and various kinds of data. The storage device 44 has a parts database 441 stored therein. The parts database 441 is a database having stored therein information on parts which constitute a processing machine installed in the food-processing facility. Examples of the "parts which constitute a processing machine" include metal parts (such as a bolt, a nut, and a screw) and metal-containing non-metal parts (such as a cable tie made of a resin and mixed with a magnetic powder).

Here is a description of an example of the parts database 441, provided with reference to FIG. 3. As illustrated in FIG. 3, the parts database 441 has stored therein the name of each of the parts, the shape of each part, and the processing machine to which each part is fixed. For example, the stirring machine has a bolt B1, a nut N1, and a screw S1 fixed thereto. The filling machine has a bolt B2, a nut N2, and a screw S2 fixed thereto. The packaging machine has a bolt B3, a nut N3, and a screw S3 fixed thereto. The shape of each of the parts indicates, for example, the size in compliance with JIS (the Japanese Industrial Standards), and is represented as φ (diameter), length, pitch, or the like. Note that, the outer shapes of the bolts B1 to B3, the nuts N1 to N3, the screws S1 to S3 may also be stored in the parts database 441. In the present embodiment, the "shape of a part" means both the "size of the part" and the outer shape of the part".

Referring again to FIG. 2, the display 47 is composed of a liquid crystal display or an organic EL display, and various kinds of information is displayed on the display 47.

The communication I/F 46 is placed in the form of hardware such as a network adapter, communications software, or a combination thereof, and is used to communicate with the metal detector 10.

(Function of Processor 41 of Management Device 40)

Figure 4:
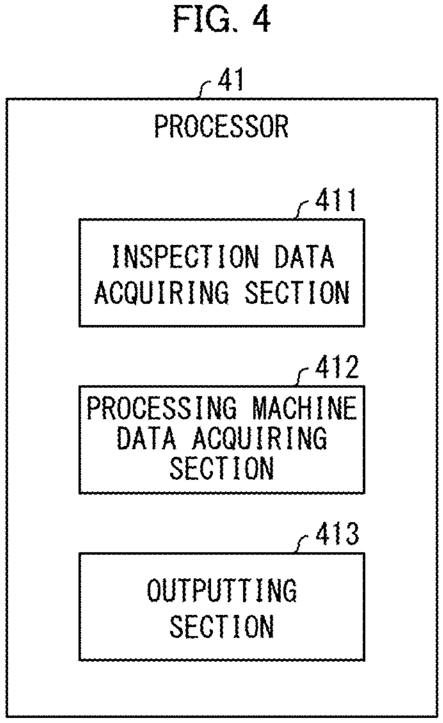
FIG. 4 is a functional block diagram of a processor of the management device in accordance with Embodiment 1 of the present disclosure.

The functions of the processor 41 of the management device 40 will be described next with reference to FIG. 4. FIG. 4 is a functional block diagram of the processor 41 of the management device 40. As illustrated in FIG. 4, in the management device 40 of the present embodiment, the processor 41 executes a specific program, to function as an inspection data acquiring section 411, a processing machine data acquiring section 412, and an outputting section 413.

The inspection data acquiring section 411 acquires data on inspection from the metal detector 10 via the communication I/F 46, and stores, in the storage device 44, the data acquired. The processing machine data acquiring section 412 acquires, based on the data acquired by the inspection data acquiring section 411, information on the state of a processing machine. Examples of the information on the state of a processing machine include information in which a processing machine which the metal foreign substance 30 has fallen off is identified. This may be restated as follows: the processing machine data acquiring section 412 has the function of identifying, based on the data acquired by the inspection data acquiring section 411, a processing machine which the metal foreign substance 30 has fallen off. The outputting section 413 displays, on the display 47, the information on the processing machine acquired by the processing machine data acquiring section 412, to notify the worker of the food-processing facility.

Figure 5:
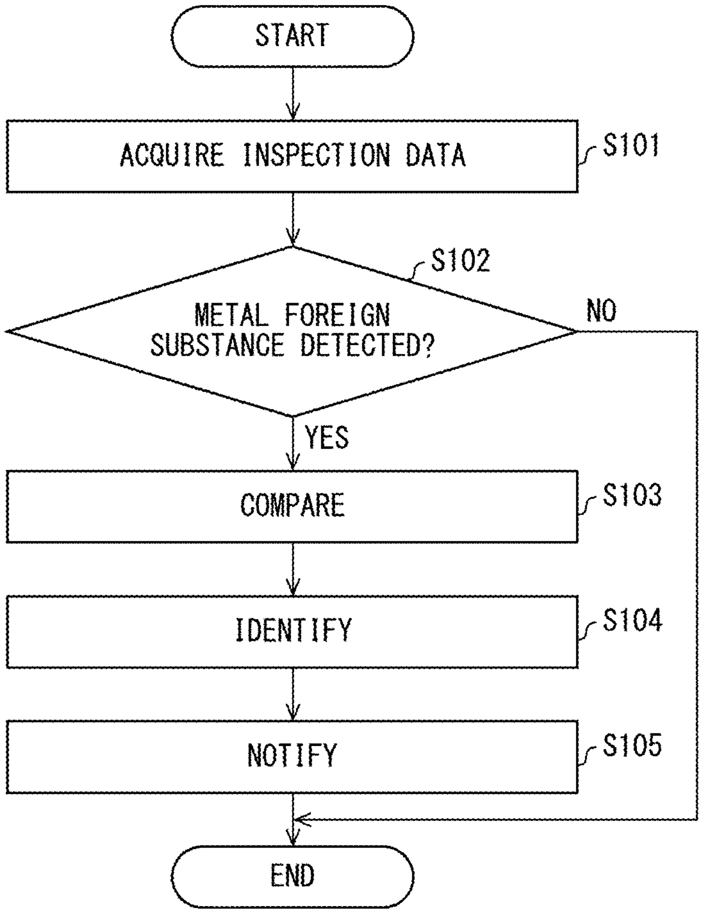
FIG. 5 is a flowchart for explaining an example operation of the management device in accordance with Embodiment 1 of the present disclosure.

An example operation of the management device 40 will be described next, with reference to FIG. 5. The process illustrated in FIG. 5 is repeatedly carried out at predetermined intervals.

In step S101, the processor 41 of the management device 40 acquires data on inspection from the metal detector 10 via the communication I/F 46. The data on inspection contains, for example, data which indicates that the metal foreign substance 30 has been detected and data on foreign substance detection.

In a case where the data acquired in the process of step S101 contains data which indicates that the metal foreign substance 30 has been detected (YES in step S102), the process proceeds to step S103. In a case where the data acquired in the process of step S101 does not contain data which indicates that the metal foreign substance 30 has been detected (NO in step S102), the series of processes ends.

In step S103, the processor 41 of the management device 40 infers the shape of the metal foreign substance 30 based on the data on foreign substance detection acquired in the process of step S101. For example, as described above, in a case where the data on foreign substance detection is a voltage waveform as a function of the breadth of voltage and the breadth of time that are based on the electric signal which varies in relation to the magnetic field which varies due to the metal foreign substance 30, it is possible for the processor 41 of the management device 40 to infer the shape of the metal foreign substance 30 based on this data. The processor 41 of the management device 40 matches the data on the shape of the inferred metal foreign substance 30 against data stored in the parts database 441, to infer a part which agrees or approximately agrees with the metal foreign substance 30 detected. In this respect, assume, for example, that the shape of the metal foreign substance 30 acquired in the process of step S101 agrees or approximately agrees with the shape of the bolt B3 indicated in FIG. 3. In this case, the processor 41 of the management device 40 can identify the bolt B3 as the metal foreign substance 30 mixed in the product 20 (step S104). Further, the processor 41 of the management device 40 refers to the parts database 441, to understand that a processing machine to which the bolt B3 is fixed is the packaging machine. Thus, in the process of step S104, it is possible for the processor 41 of the management device 40 to identify the bolt B3 as the metal foreign substance 30 mixed in the product 20, and also identify the bolt B3 as having fallen off the packaging machine.

The process proceeds to step S105, and the processor 41 of the management device 40 displays, on the display 47, the result identified in step S104, to notify the worker. For example, the message "the metal foreign substance detected is highly likely to be the bolt B3 having fallen off the packaging machine" is displayed on the display 47. The worker who checks the display 47 can understand the processing machine which the metal foreign substance 30 mixed in the product 20 has fallen off.

It should be noted that the flow of the processes described with reference to FIG. 5 is an example flow, and without departing from the spirit of the present disclosure, a step may be deleted, a new step may be added, or the ordinal numbers of steps in the flow may be interchanged with each other.

(Variation)

Figure 6:
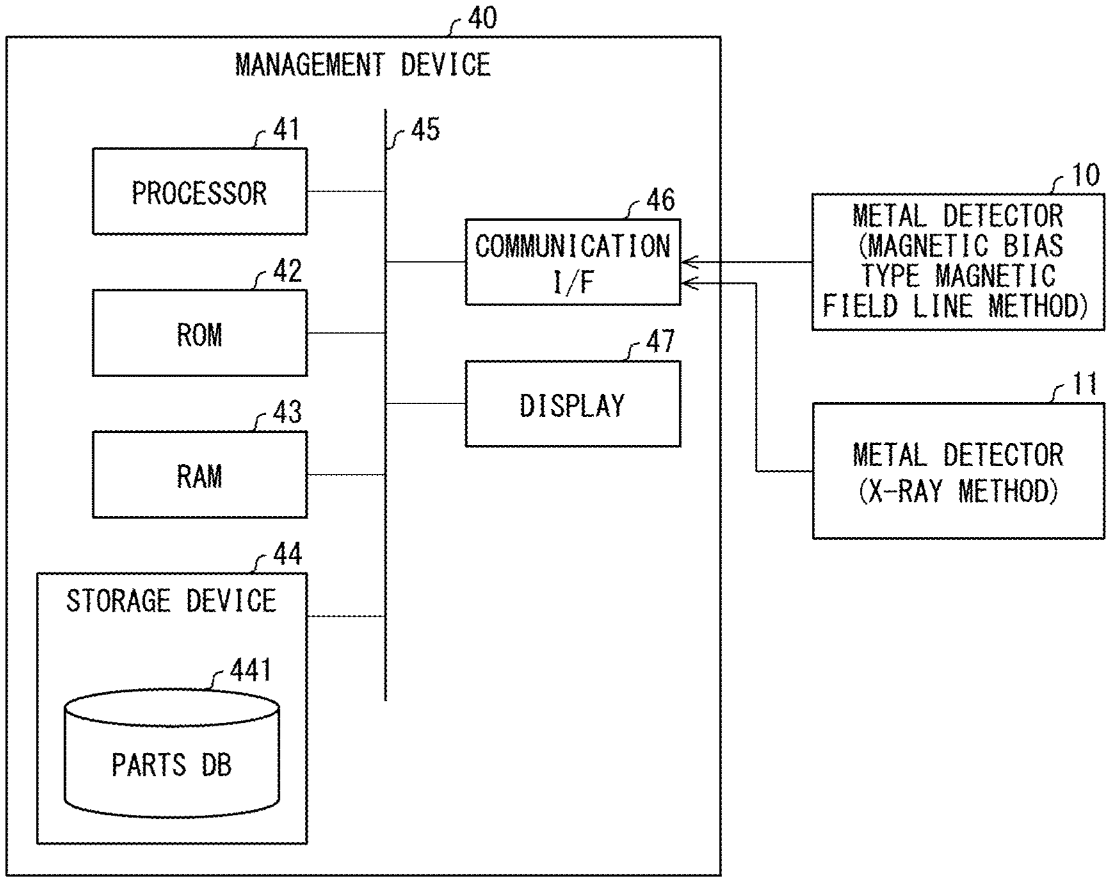
FIG. 6 is a block diagram illustrating a hardware configuration in accordance with Variation of Embodiment 1 of the present disclosure.

Variation of Embodiment 1 will be described next with reference to FIG. 6. In Variation, the management device 40 acquires data on inspection from two metal detectors 10 and 11, as illustrated in FIG. 6. The metal detector 10 is the same as that in Embodiment 1. The metal detector 11 is a machine for detecting the metal foreign substance 30 by an X-ray method. The X-ray method is a method of irradiating the product 20 with X-rays, which are a type of electromagnetic wave, to detect the metal foreign substance 30 by the difference in the amount of transmission. The amount of transmission depends on thickness and density, and X-rays are blocked to a greater degree for a greater thickness and a greater density. A metal, the density of which is high, is imaged in a darker shade than is a product being inspected. It is therefore possible to detect a metal as a foreign substance.

In Variation, two methods which are the magnetic bias type magnetic field line method and the X-ray method are used as the method by which the metal foreign substance 30 is detected. By using two methods in combination, it is possible to infer the shape of the metal foreign substance 30 more accurately than by using the magnetic bias type magnetic field line method alone.

(Example of Foreign Substance Inference Method)

Described below is an example method for making an inference of what foreign substance the foreign substance detected by the magnetic bias type magnetic field line method and the X-ray method is. In Variation, a threshold is set to be used for inference of what foreign substance the foreign substance is, i.e. the type of foreign substance, based on X-ray transmission image data and magnetism variation data that are obtained through an experiment, a simulation, and the like conducted with use of a foreign substance sample.

Figure 7:
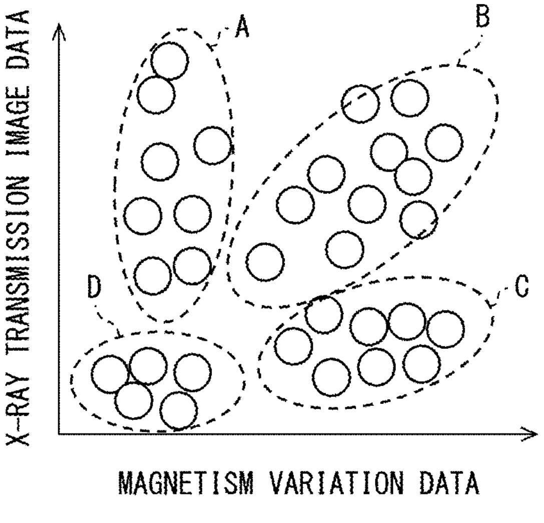
FIG. 7 is a graph illustrating a relationship between X-ray transmission image data and magnetism variation data.

Here is a description of the threshold, provided with reference to FIG. 7. FIG. 7 is a graph illustrating a relationship between X-ray transmission image data and magnetism variation data. In FIG. 7, the vertical axis represents X-ray transmission image data obtained via the X-ray method, and the horizontal axis represents magnetism variation data obtained via the magnetic bias type magnetic field line method. Note that in FIG. 7, the foreign substance includes a resin foreign substance in addition to a metal foreign substance. That is, in the present embodiment, the foreign substance to be detected is not limited to a metal foreign substance, but may also include a resin foreign substance.

As an example, the X-ray transmission image data contains the amount of X-ray transmission and a transmission sample area. As an example, the magnetism variation data contains the amplitude of a voltage waveform, the time integration of voltage, and the amount of variation in voltage per unit time. Based on the X-ray transmission image data and the magnetism variation data obtained in advance through an experiment, a simulation, and the like conducted with use of a foreign substance sample, a Mahalanobis distance is set with use of the so-called Mahalanobis Taguchi (MT) method. In Variation, as an example, a Mahalanobis distance is used as the threshold for making an inference of what foreign substance the foreign substance is, i.e. the type of foreign substance. By the MT method, thresholds A to D indicated by circles are set, as illustrated in FIG. 7. The thresholds A to D are referred to as "threshold circles A to D", unless otherwise noted.

The type of foreign substance is inferred according to within which of the threshold circles A to D data detected by the magnetic bias type magnetic field line method and the X-ray method exists. Specifically, in a case where the data on inspection exists within the threshold circle A, it is inferred that the foreign substance is an organic foreign substance such as a resin. In a case where the data on inspection exists within the threshold circle B, it is inferred that the foreign substance is a metal foreign substance such as a bolt, a nut, or a screw. In a case where the data on inspection exists within the threshold circle C, it is inferred that the foreign substance is a metal foreign substance such as a piece of wire or a linear metal piece. In a case where the data on inspection exists within the threshold circle D, it is inferred that no foreign substance is detected. Further, in a case where there is data on inspection which exists at a position far away from the threshold circles A to D, the processor 41 of the management device 40 judges that an unexpected anomaly has occurred in the food-processing facility, and may display the judgment result on the display 47.

Figure 8:
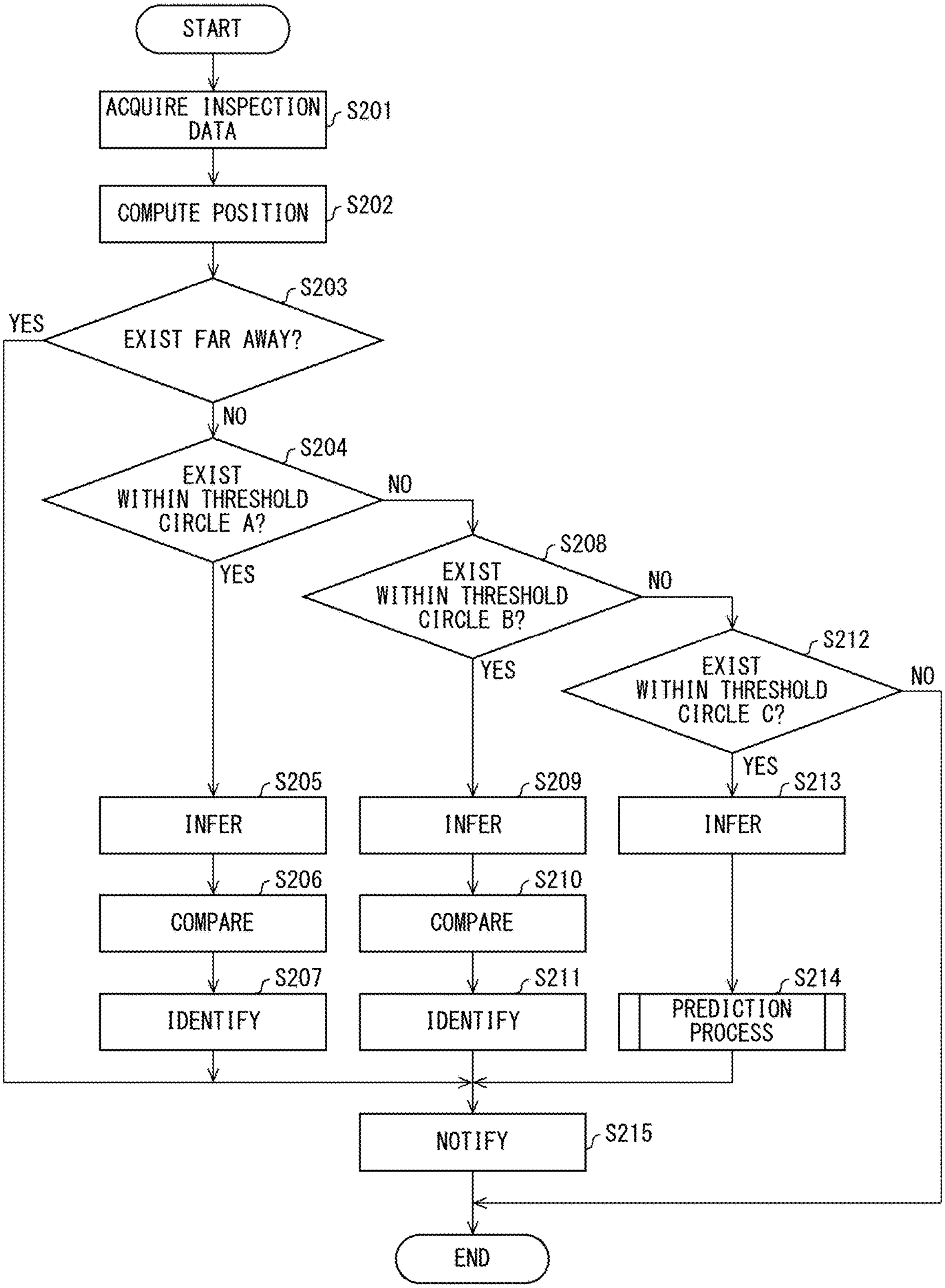
FIG. 8 is a flowchart for explaining an example operation of a management device in accordance with Variation of Embodiment 1 of the present disclosure.

An example operation of the management device 40 in Variation will be described next, with reference to FIG. 8. The process illustrated in FIG. 8 is repeatedly carried out at predetermined intervals. Further, the threshold circles A to D described with reference to FIG. 7 shall be set in advance.

In step S201, the processor 41 of the management device 40 acquires data on inspection from the metal detector 10 and the metal detector 11 via the communication I/F 46.

In step S202, the processor 41 of the management device 40 computes where the data acquired by the process of step S201 exists in the graph of FIG. 7.

In a case where the data acquired by the process of step S201 exists at a position far away from the threshold circles A to D (YES in step S203), the processor 41 of the management device 40 judges that an unexpected anomaly has occurred in the food-processing facility, and displays the judgment result on the display 47 to notify a worker (step S215).

In a case where the result in the step S203 is NO, the process proceeds to step S204. In a case where the data acquired by the process of step S201 exists within the threshold circle A (YES in step S204), the process proceeds to step S205, and the processor 41 of the management device 40 infers that the foreign substance mixed in the product 20 is an organic foreign substance, such as a resin.

The process proceeds to step S206, the processor 41 of the management device 40 matches the data on the shape of the foreign substance against the data stored in the parts database 441.

The process proceeds to step S207, the processor 41 of the management device 40 infers and identifies, based on the comparison result in step S206, a processing machine which the foreign substance mixed in the product 20 has fallen off.

The process proceeds to step S215, and the processor 41 of the management device 40 displays, on the display 47, the result identified in step S207, to notify the worker.

In a case where the data acquired by the process of step S201 does not exist within the threshold circle A (NO in step S204), the process proceeds to step S208. In a case where the data acquired by the process of step S201 exists within the threshold circle B (YES in step S208), the process proceeds to step S209, and the processor 41 of the management device 40 infers that the foreign substance mixed in the product 20 is the metal foreign substance 30, such as a bolt, a nut, or a screw.

The process proceeds to step S210, the processor 41 of the management device 40 matches the data on the shape of the metal foreign substance 30 against the data stored in the parts database 441.

The process proceeds to step S211, the processor 41 of the management device 40 infers and identifies, based on the comparison results in step S210, a processing machine which the metal foreign substance 30 mixed in the product 20 has fallen off.

The process proceeds to step S215, and the processor 41 of the management device 40 displays, on the display 47, the result in step S211, to notify the worker.

In a case where the data acquired by the process of step S201 does not exist within the threshold circle B (NO in step S208), the process proceeds to step S212. In a case where the data acquired by the process of step S201 exists within the threshold circle C (YES in step S212), the process proceeds to step S213, and the processor 41 of the management device 40 infers that the foreign substance mixed in the product 20 is a metal foreign substance such as a piece of wire, a linear metal piece, or a fine metal powder.

The process proceeds to step S214, the processor 41 of the management device 40 carries out a prediction process based on the result of the inference made in step S213. The details of this prediction process will be described later in Embodiment 2.

In a case where the data acquired by the process of step S201 does not exist within the threshold circle C (NO in step S212), i.e. the data acquired by the process of step S201 exists within the threshold circle D, the processor 41 of the management device 40 infers that the no foreign substance is detected, and the series of processes ends.

It should be noted that the flow of the processes described with reference to FIG. 8 is an example flow, and without departing from the spirit of the present disclosure, a step may be deleted, a new step may be added, or the ordinal numbers of steps in the flow may be interchanged with each other.

(Effects)

As described above, Embodiment 1 provides the following effects.

The management system 100 manages a processing facility, and includes: a foreign substance detector for detecting whether a foreign substance is mixed in the product 20 manufactured by a processing machine in the processing facility; and a processor 41 of the management device 40 capable of processing information on the foreign substance detected by the foreign substance detector.

The processor 41 of the management device 40 acquires the information on the foreign substance from the foreign substance detector, and acquires, based on the information on the foreign substance, information on the state of the processing machine. The "foreign substance" here at least includes a metal foreign substance 30 and a resin foreign substance. Examples of the foreign substance detector are the metal detectors 10 and 11.

As described above, in order to acquire information on the state of a processing machine, such as, in a case of a processing facility includes a plurality of processing machines, identification of a processing machine in which an anomaly has occurred, it is necessary to provide a plurality of detecting means such as a sensor and an image capturing device; however, this presents problems including an increase in cost and an increase in a burden on a worker. The inventors focused on acquiring information on the state of a processing machine with use of a foreign substance detector already installed in the processing facility. With this configuration, it is possible to acquire the information on the status of a processing machine without providing a plurality of detecting means. This makes it possible to contribute a cost reduction and further lighten a burden on a worker.

The information on the state of a processing machine may be identification information regarding a target processing machine identified from among a plurality of processing machines. The "target processing machine" here refers to a processing machine which a foreign substance has fallen off. The foreign substance may be the metal foreign substance 30.

Upon detection of the metal foreign substance 30 mixed in the product 20, a worker stops all the processing machines to start inspecting all the processing machines. The inspection here is a task of searching for a processing machine which the metal foreign substance 30 has fallen off. The inspection is considered to be carried out by an experienced worker familiar with the food-processing facility. However, in the existing field conditions, where man power lacks and pressure for manufacture is placed on a daily basis, even if such the product 20 mixed with the metal foreign substance 30 is successfully prevented from being put on the market, there is a possibility of causing a delay in responding to the factor in the mixing itself.

With the above configuration, it is possible for the processor 41 of the management device 40 to identify a processing machine which the metal foreign substance 30 mixed in the product 20 has fallen off. The processor 41 of the management device 40 may display the result of the identification on the display 47, to notify a worker. The worker who checks the display 47 can understand the processing machine which the metal foreign substance 30 mixed in the product 20 has fallen off. This enables even a worker who is unfamiliar with processing machines to immediately identify the processing machine which is the factor in the mixing. This makes it possible to significantly reduce the time and cost required for the inspection of processing machines, and a burden on a worker is lightened. This enables the worker to bring the processing machines into operation again after inspecting and repairing a target processing machine alone, and early and safely restart the production activity.

The foreign substance detector may be a device for detecting a foreign substance with use of magnetic field lines. The processor 41 of the management device 40 may infer, based on information on a foreign substance, the shape of the foreign substance and match the shape of the foreign substance against parts data stored in advance, to identify a target processing machine from among a plurality of processing machines.

With this configuration, it is possible to identify, from among a large number of processing machines, a processing machine which a foreign substance has fallen off.

By using the magnetic bias type magnetic field line method as the method for detecting the metal foreign substance 30, it is possible to detect the metal foreign substance 30 not only within a paper, vinyl, or plastic package but also within an aluminum package. With the magnetic bias type magnetic field line method, it is also possible to detect the packaging anomaly of, for example, the condition of welding of a package, through the intensity of eddy-current which develops on the surface of an electrically-conductive packaging material such as an aluminum package. This makes it possible to not only identify a target processing machine but also detect, based on the result of the detection of an anomaly of an electrically-conductive packaging material, the anomaly of a packaging machine.

The metal detector 10 may be a first metal detector for detecting a foreign substance with use of magnetic field lines, and the management system 100 may further include a second metal detector for detecting a foreign substance with use of X-rays. The processor 41 of the management device 40 may acquire information on a foreign substance from the first metal detector and the second metal detector, infer, based on the information on the foreign substance, the shape of the foreign substance, and match the shape of the foreign substance against parts data stored in advance, to identify a target processing machine from among a plurality of processing machines. Note that the second metal detector may correspond to the metal detector 11.

With this configuration, the processor 41 of the management device 40 uses information detected by the magnetic bias type magnetic field line method and the X-ray method to infer the shape of a foreign substance. Using two methods in combination improves the accuracy of inference of the shape of a foreign substance to a greater degree than using either one of the methods. The processor 41 of the management device 40 matches the inferred shape of a foreign substance against information on the parts of processing machines which is stored in advance in the parts database 441, to identify a processing machine which the foreign substance mixed in the product 20 has fallen off. The improvement in the accuracy of inference of the shape of a foreign substance leads to an improvement in the accuracy of identification of a processing machine.

Embodiment 2

Figure 9:
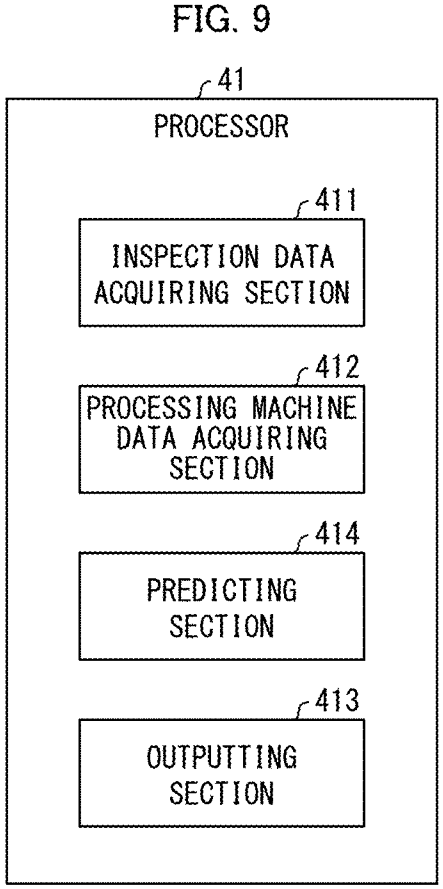
FIG. 9 is a functional block diagram of a processor of a management device in accordance with Embodiment 2 of the present disclosure.
Figure 10:
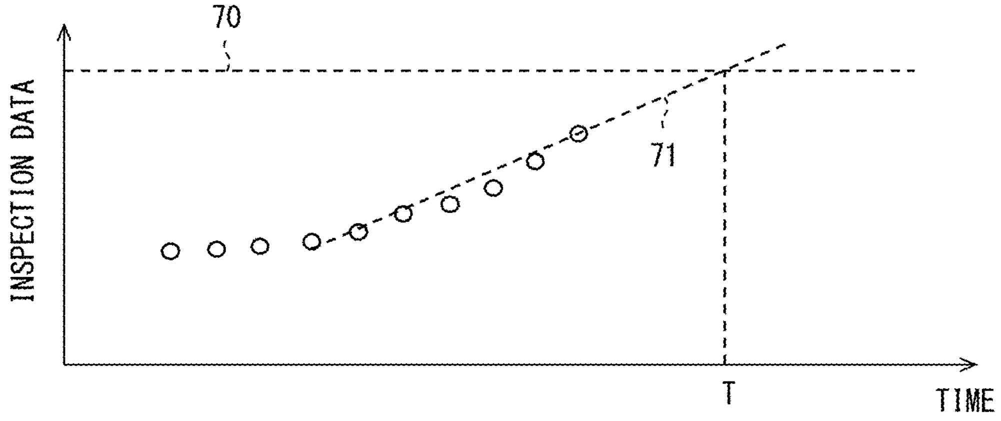
FIG. 10 is a time series graph illustrating a relationship between inspection data and time.
Figure 11:
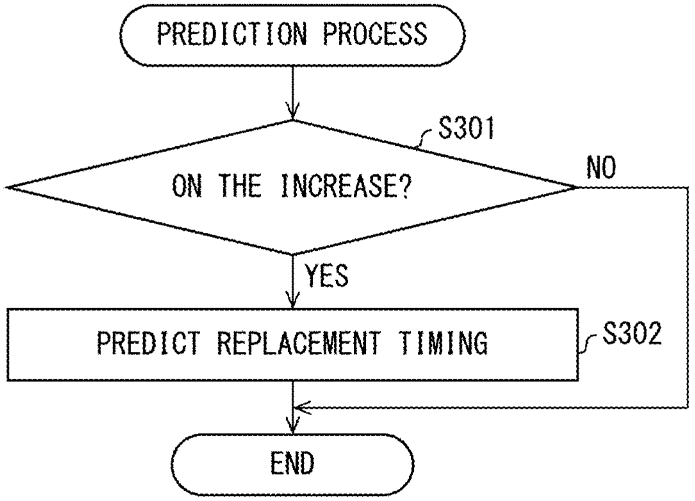
FIG. 11 is a flowchart for explaining an example operation of the management device in accordance with Embodiment 2 of the present disclosure.

The following description will discuss Embodiment 2 of the present disclosure with reference to FIGS. 9 to 11. For convenience of explanation, a member having the same function as a member described in Embodiment 1 is assigned the same reference sign, and the description thereof is not repeated.

FIG. 9 is a functional block diagram of a processor 41 of a management device 40 in accordance with Embodiment 2. The difference between Embodiment 1 and Embodiment 2 is that in the management device 40 of Embodiment 2, the processor 41 executes a specific program to further function as a predicting section 414.

The predicting section 414 predicts, based on inspection data obtained by, for example, the X-ray method or the magnetic bias type magnetic field line method, a replacement timing of a metal blade provided in a processing machine. The blade used for mixing and stirring of food wears due to, for example, the friction between the blade and a metal container in which to put a material and aging deterioration of the blade itself. A powdery substance which is a fine metal powder generated by this wear can be mixed in a product 20. The amount of the powdery substances generated by the wear increases as the duration of use of the blade extends, and a timing at which the replacement is necessary comes. The predicting section 414 predicts such a replacement timing. An example of the blade replacement timing prediction method will be described below with reference to FIG. 10. As an example, the powdery substance is a fine metal powder of a size not greater than a predetermined size. The predetermined size is calculated through, for example, an experiment, a simulation, and the like. The powdery substance may be a fine resin powder of a size not greater than the predetermined size.

(Example of Replacement Timing Prediction Method)

FIG. 10 is a time series graph illustrating the relationship between time and inspection data obtained by the X-ray method or the magnetic bias type magnetic field line method. In FIG. 10, the vertical axis represents the inspection data obtained by the X-ray method or the magnetic bias type magnetic field line method, and the horizontal axis represents a time. In a case where the vertical axis represents inspection data obtained by the X-ray method, an example of the inspection data is X-ray transmission image data. In a case where the vertical axis represents inspection data obtained by the magnetic bias type magnetic field line method, an example of the inspection data is magnetism variation data.

As illustrated in FIG. 10, as a time to use the blade passes, variation occurs in the inspection data. As is clear from FIG. 10, the inspection data is on the increase. This variation is due to an increase in the amount of fine metal powder generated by the wear of the blade caused by the friction between the blade and the container and the aging deterioration of the blade. The processor 41 of the management device 40 can predict a timing T at which the inspection data reaches a threshold 70 indicating an anomalous value and which is the timing to replace the blade, by approximating the plotted inspection data by a straight line 71 with use of, for example, a single regression analysis. The straight line 71 may be computed with use of, for example, the method of least squares. Further, the inspection data analysis method is not limited to a single regression analysis, but may be a multiple regression analysis, or may be machine learning.

An example operation of the management device 40 in accordance with Embodiment 2 will be described below with reference to the flowchart of FIG. 11. As described in Variation of Embodiment 1, the flowchart of FIG. 11 corresponds to the process of step S214 of FIG. 8.

In step S301, the processor 41 of the management device 40 judges whether the inspection data obtained by the X-ray method or the magnetic bias type magnetic field line method is on the increase. In a case where the inspection data is on the increase (YES in step S301), the process proceeds to step S302, and the processor 41 of the management device 40 predicts the replacement timing of the blade with use of, for example, the single regression analysis described above, and displays the result of the prediction on a display 47 to notify a worker.

Although the blade is taken as the metal part which is the subject of the replacement timing prediction in the above description, the subject of the replacement timing prediction is not limited to this, but is any metal part the wear of which is caused.

In addition, although the replacement timing of the blade is predicted as the subject of the prediction, the subject of the prediction is not limited to this. For example, the subject of prediction may be an inspection timing of the blade. That is, the subject of the prediction may be a maintenance timing of the blade, the maintenance including replacement and inspection.

(Effects)

As described above, Embodiment 2 provides the following effects.

The processor 41 of the management device 40 may acquire information on a foreign substance from a foreign substance detector, to predict, based on the information on the foreign substance, a maintenance timing of a processing machine. That is, information on the state of the processing machine may be prediction information regarding a maintenance timing of a processing machine. Note that the "maintenance timing of a processing machine" may be restated as a "maintenance timing of the parts which constitute the processing machine".

Examples of the parts include the above-described metal blade used in mixing and stirring food. Such a blade wears due to the friction between the blade and a metal container in which to put food and aging deterioration of the blade itself. In many cases, the check for the degree of wear is visually performed by a worker, and therefore presents problems such as obtaining workers involved in maintenance operations and maintaining a certain level of inventory. With the above configuration, it is possible to lighten the burden of check work imposed on a worker by predicting the maintenance timing of the blade and notifying the worker of the result of the prediction, and it is also possible to manage the inventory of the blade in a limited amount.

The information on a foreign substance may be information which indicates that the foreign substance is a powdery substance having a size not greater than the predetermined size. Based on the amount of detected powdery substances which increases over time, the processor 41 of the management device 40 may predict a maintenance timing of a processing machine.

With this configuration, in a case where mixing of a powdery substance is proved to consecutively have occurred, it is possible for the processor 41 of the management device 40 to predict the maintenance timing of the parts which constitute a processing machine which is the factor in the mixing, and notify a worker of the result of the prediction. This enables the worker to replace the parts in a timely manner and manage the inventory of the parts in limited amounts.

Embodiment 3

Figure 12:
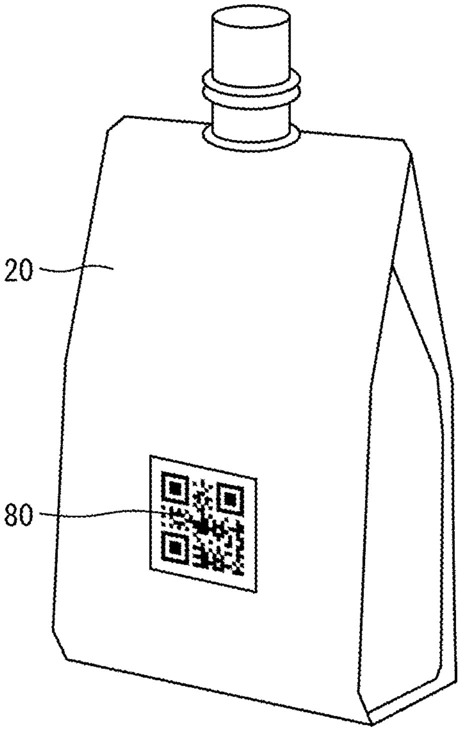
FIG. 12 is a diagram illustrating a product to which a two-dimensional code is attached.

The following description will discuss Embodiment 3 of the present disclosure with reference to FIG. 12. For convenience of explanation, a member having the same function as a member described in Embodiment 1 is assigned the same reference sign, and the description thereof is not repeated.

As illustrated in FIG. 12, a package of a product 20 may have a two-dimensional code 80 attached thereto. The two-dimensional code 80 has predetermined information stored therein. Examples of the predetermined information include information indicating the date when and the place where a foreign substance inspection process was performed by a foreign substance detector, information indicating a foreign substance inspection result, and information indicating a business entity which inspected the product 20.

By attaching the two-dimensional code 80 to the product 20, it is possible for a consumer to know when, where, and by which business entity the product 20 was inspected, and the result of the inspection.

The mixing of a foreign substance is not limited to the mixing due to breakage or falling off of a part of a processing machine, but there is also a case where a foreign substance is intentionally mixed on the consumer side while the product 20 is on the market, for example, for sale at retail. Therefore, simply collecting and managing foreign substance inspection data on the manufacturer side is insufficient in some cases. Attaching, to each product, foreign substance inspection data in the form of the two-dimensional code 80 makes it possible to immediately check the result of a foreign substance inspection upon occurrence of mixing of a foreign substance, and thus makes it possible to confirm the safety in the manufacture of food.

The two-dimensional code 80 is not limited to a particular type. For example, a QR code (registered trademark) may be used for the two-dimensional code 80. This enables a consumer to easily acquire information with use of a smartphone or the like.

In Embodiment 1 and Embodiment 2 above, the processor 41 of the management device 40 is described as identifying a target processing machine, based on information on the metal foreign substance 30, or predicting a maintenance timing of a part, based on the information on the metal foreign substance 30. This configuration may be restated as follows. Specifically, the restatement may be that the processor 41 of the management device 40 infers the state of a processing machine, based on the information on the metal foreign substance 30.

The "inferring the state of a processing machine" includes "identifying a target processing machine" and "predicting a maintenance timing of a part provided in a processing machine". This respect will be described below.

With respect to the "identifying a target processing machine", the identification based on information on the metal foreign substance 30 is described in Embodiment 1 above by way of example. While carrying out this identifying process, it is possible, in the background processing of the processor 41 of the management device 40, to judge the state of a processing machine based on, for example, the information on the metal foreign substance 30. Specific examples of the state of a processing machine include normality and anomaly. That is, in the background processing of the processor 41 of the management device 40, a process of judgment which is, for example, "stirring machine: normal", "filling machine: normal", "packaging machine: anomalous" can be carried out. The packaging machine is judged to be anomalous here because a bolt B3 is identified as having fallen off the packaging machine, as described above.

As above, the "identifying a target processing machine which the metal foreign substance 30 has fallen off, i.e. identifying the metal foreign substance 30 as having fallen off the packaging machine" can be said to be "inferring the state of a processing machine, i.e. inferring that the packaging machine is in an anomalous state".

Subsequently, with respect to the "predicting a maintenance timing of a part provided in a processing machine", the prediction based on the information on the metal foreign substance 30 is described in Embodiment 2 above by way of example. The predicting a maintenance timing of a part is restated as inferring a degree to which the part has become deteriorated or a degree to which the part will become deteriorated in the future when the part continues to be used as it is. In addition, since the part is "a portion of a processing machine", it can be said that the "predicting a maintenance timing of the part" is "inferring the state of the processing machine".

[Software Implementation Example]

The functions of the management device 40 can be implemented by a program for causing a computer to function as the management device 40, the program causing the computer to function as each of the control blocks of the management device 40.

In this case, the management device 40 includes a computer which is hardware for executing the program, the computer including at least one device (e.g. processor) and at least one storage device (e.g. memory). The computer executes the program, and each of the functions described in the above embodiments is implemented accordingly.

One or more non-transitory computer-readable recording media may have the program recorded thereon. These recording media may or may not be included in the management device 40. In the latter case, the program may be supplied to or made available to the management device 40 via any wired or wireless transmission medium.

Furthermore, some or all of the functions of each control block can also be implemented by a logic circuit. For example, an integrated circuit having formed therein the logic circuit which functions as each control block is also within the scope of the present disclosure. In addition, the functions of each control block can be implemented via, for example, a quantum computer.

Each of the processes described in the embodiments above may be carried out by artificial intelligence (AI). In this case, the AI may operate in the management device 40, or may operate in another device (e.g. an edge computer or a cloud server).

The present disclosure is not limited to the embodiments above, but can be altered by a skilled person in the art within the scope of the claims. The present disclosure also encompasses, in its technical scope, any embodiment derived by combining technical means disclosed in differing embodiments.

[Additional Remarks]

The present disclosure can be expressed as follows.

A management system in accordance with Aspect 1 of the present disclosure is a management system for managing a processing facility, and has a configuration in which the management system including: a foreign substance detector for detecting whether a foreign substance is mixed in a product manufactured by a processing machine in the processing facility; and a processor capable of processing information on the foreign substance detected by the foreign substance detector, the processor acquiring the information on the foreign substance from the foreign substance detector, and acquiring, based on the information on the foreign substance, information on a state of the processing machine.

A management system in accordance with Aspect 2 of the present disclosure may be such that, in Aspect 1, the information on the state of the processing machine is identification information regarding a target processing machine identified from among a plurality of processing machines.

A management system in accordance with Aspect 3 of the present disclosure may be such that, in Aspect 1, the information on the state of the processing machine is prediction information regarding a maintenance timing of the processing machine.

A management system in accordance with Aspect 4 of the present disclosure may have a configuration in which, in Aspect 2, the foreign substance detector is a device for detecting the foreign substance with use of magnetic field lines, and the processor infers, based on the information on the foreign substance, a shape of the foreign substance, and identifies the target processing machine from among the plurality of processing machines by matching the shape of the foreign substance against data on parts which constitute the processing machine, the data being stored in advance.

A management system in accordance with Aspect 5 of the present disclosure may have configuration in which, in Aspect 2 or 4, the foreign substance detector is a first foreign substance detector for detecting the foreign substance with use of magnetic field lines; the management system further comprises a second foreign substance detector for detecting the foreign substance with use of X-rays; and the processor acquires the information on the foreign substance from the first foreign substance detector and the second foreign substance detector, infers, based on the information on the foreign substance, a shape of the foreign substance, and identifies the target processing machine from among the plurality of processing machines by matching the shape of the foreign substance against data on parts which constitute the processing machine, the data being stored in advance.

A management system in accordance with Aspect 6 of the present disclosure may have a configuration in which, in Aspect 3, the information on the foreign substance is information which indicates that the foreign substance has a size not greater than a predetermined size and is a powdery substance, and the processor predicts a maintenance timing of the processing machine, based on an amount of the powdery substance detected, the amount increasing over time.

A management system in accordance with Aspect 7 of the present disclosure may have a configuration in which, in any one of Aspects 1 to 6, the processor carries out a process of displaying, on a display, the information on the state of the processing machine acquired.

A management system in accordance with Aspect 8 of the present disclosure may have a configuration in which, in any one of Aspects 1 to 7, a two-dimensional code is attached to a package of the product which is a subject of detection by the foreign substance detector, the two-dimensional code having stored therein information indicating a date when and a place where a foreign substance inspection process was performed by the foreign substance detector, information indicating a foreign substance inspection result, and information indicating a business entity which inspected the product.

A management system in accordance with Aspect 9 of the present disclosure may have a configuration in which, in any one of Aspects 1 to 8, the foreign substance is a metal foreign substance.

A management system in accordance with Aspect 10 of the present disclosure is a management method for managing a processing facility, the management method including the steps of: acquiring, from a foreign substance detector for detecting whether a foreign substance is mixed in a product manufactured by a processing machine in the processing facility, information on the foreign substance, acquiring, based on the information on the foreign substance, information on a state of the processing machine.

The invention claimed is:

1. A management system comprising:

a foreign substance detector for detecting whether a foreign substance is mixed in a product manufactured by a processing machine in a processing facility; and a processor configured to:

acquire information on the foreign substance from the foreign substance detector;

infer, based on the information on the foreign substance, a shape of the foreign substance; and identify a target processing machine, from which the foreign substance has fallen off, from among a plurality of processing machines by matching the inferred shape of the foreign substance against data on parts which constitute the plurality of processing machines, the data being stored in advance, wherein the identification of the target processing machine is acquired as information on a state of the processing machine.

2. The management system according to claim 1, wherein the information on the state of the processing machine is identification information regarding a target processing machine identified from among a plurality of processing machines.

3. The management system according to claim 1, wherein the information on the state of the processing machine is prediction information regarding a maintenance timing of the processing machine.

4. The management system according to claim 2, wherein the foreign substance detector is a device for detecting the foreign substance with use of magnetic field lines.

5. The management system according to claim 2, wherein:

the foreign substance detector is a first foreign substance detector for detecting the foreign substance with use of magnetic field lines;

the management system further comprises a second foreign substance detector for detecting the foreign substance with use of X-rays; and the processor acquires the information on the foreign substance from the first foreign substance detector and the second foreign substance detector, infers, based on the information on the foreign substance, a shape of the foreign substance, and identifies the target processing machine from among the plurality of processing machines by matching the shape of the foreign substance against data on parts which constitute the processing machine, the data being stored in advance.

6. The management system according to claim 3, wherein:

the information on the foreign substance is information which indicates that the foreign substance has a size not greater than a predetermined size and is a powdery substance; and the processor predicts a maintenance timing of the processing machine, based on an amount of the powdery substance detected, the amount increasing over time.

7. The management system according to claim 1, wherein the processor carries out a process of displaying, on a display, the information on the state of the processing machine acquired.

8. The management system according to claim 1, wherein a two-dimensional code is attached to a package of the product which is a subject of detection by the foreign substance detector, the two-dimensional code having stored therein information indicating a date when and a place where a foreign substance inspection process was performed by the foreign substance detector, information indicating a foreign substance inspection result, and information indicating a business entity which inspected the product.

9. The management system according to claim 1, wherein the foreign substance is a metal foreign substance.

10. A management method comprising the steps of:

acquiring, from a foreign substance detector for detecting whether a foreign substance is mixed in a product manufactured by a processing machine in a processing facility, information on the foreign substance;

inferring, based on the information on the foreign substance, a shape of the foreign substance; and identifying a target processing machine, from which the foreign substance has fallen off, from among a plurality of processing machines by matching the inferred shape of the foreign substance against data on parts which constitute the plurality of processing machines, the data being stored in advance, wherein the identification of the target processing machine is acquired as information on a state of the processing machine.

* * * * *